Figure 1:
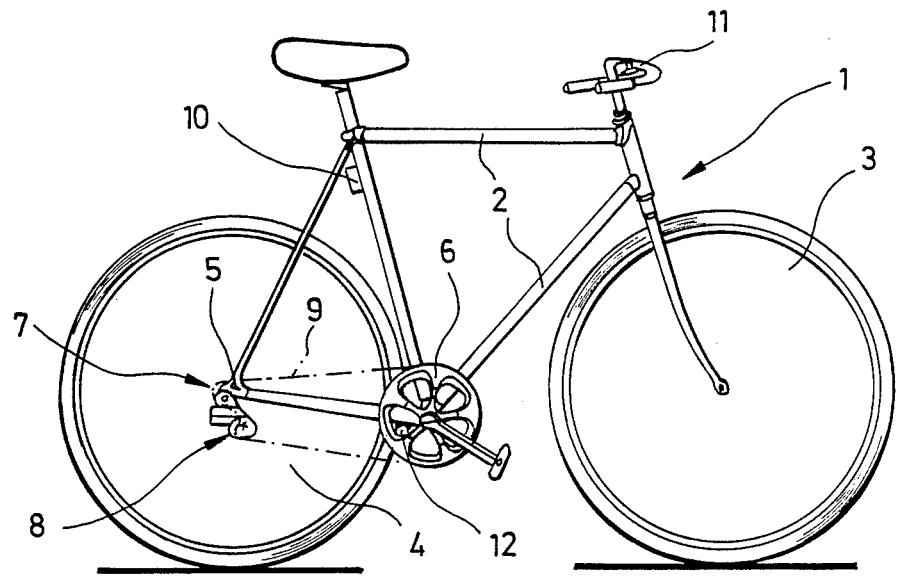

United States Patent [19]

Bühlmann

[11] Patent Number: 4,946,425
[45] Date of Patent: Aug. 7, 1990

[54] ELECTROMECHANICAL BICYCLE GEAR SHIFT MECHANISM

[75] Inventor: René Bühlmann, Reinach, Switzerland

[73] Assignee: Villiger Sohne AG Cigarrenfabriken, Pfeffikon LU, Switzerland

[21] Appl. No.: 207,044

[22] PCT Filed: Sep. 16, 1987

[86] PCT No.: PCT/EP87/00529

§ 371 Date: Jul. 15, 1988

§ 102(e) Date: Jul. 15, 1988

[87] PCT Pub. No.: WO88/01962

PCT Pub. Date: Mar. 24, 1988

[30] Foreign Application Priority Data

Sep. 16, 1986 [DE] Fed. Rep. of Germany ....... 3631481

[51] Int. Cl.$^5$ .......................... F16H 7/22; F16H 9/00
[52] U.S. Cl. ................................ 474/80; 192/142 R; 280/238
[58] Field of Search ...................... 474/70, 110, 79–82; 280/238; 192/142 R

[56] References Cited

U.S. PATENT DOCUMENTS

| | | | |
|---|---|---|---|
| 3,863,512 | 2/1975 | Crawley | 474/80 |
| 3,919,891 | 11/1975 | Stuhlmuller et al. | 474/70 |
| 4,041,788 | 8/1977 | Nininger, Jr. | 474/80 |
| 4,143,557 | 3/1979 | Wakebe et al. | 474/80 |
| 4,605,240 | 8/1986 | Clem et al. | 474/80 X |

FOREIGN PATENT DOCUMENTS

| | | |
|---|---|---|
| 0040509 | 11/1981 | European Pat. Off. |
| 1003373 | 3/1952 | France . |
| 1277691 | 10/1961 | France . |
| 2233220 | 1/1975 | France . |
| 2587079 | 3/1987 | France . |

Primary Examiner—Thuy M. Bui
Attorney, Agent, or Firm—Hubbard, Thurman, Turner, Tucker & Harris

[57] ABSTRACT

A bicycle gear shift mechanism (8) to be actuated by an electric motor (m) has a carrier for an actuator member (S) comprising a tensioning arm (29) of a derailleur or a shift plunger of a hub gear transmission. According to the invention, the carrier comprises a cursor (27) slidably displaceable on at least two spaced parallel guides (26) mounted at stationary positions with respect to a housing (18). According to a further aspect, a control circuit for the bicycle gear shift mechanism to be actuated by a DC motor comprises a first and a second power control circuit (70,71) controlled by first and second flip-flop circuits (60, 61) the set inputs of which are connected to switches (68, 69) for shifting to higher or lower gear ratios, and the reset inputs of which are adapted to by activated via a switch (65) which is responsive to the gear-engaged state of the gear shift mechanism.

13 Claims, 3 Drawing Sheets

ELECTROMECHANICAL BICYCLE GEAR SHIFT MECHANISM

DESCRIPTION

The invention relates to an electromechanical bicycle gear shift mechanism of the type defined in the generic clause of patent claim 1.

Described in U.S. Pat. No. 39 19 891 is an embodiment of an electromechanical gear shift mechanism of this type, in which one end of a telescopically extensible three-sided housing is secured to the vehicle frame, the other end being operatively connected to an actuator member by a pin. Mounted within the housing is a drive member in the form of a threaded spindle driven by an electric motor for retracting and extending the outer housing portion relative to the fixed housing portion in a direction parallel to the wheel axis. In an actuating mechanism of this type the distance between the actuator member and the wheel axis remains constant, in contrast to the customary cinematics of known derailleur gear shift mechanisms employing a parallelogram linkage, in which the shift actuator member is moved parallel to itself and in addition along an arcuate path. In the case of this gear shift mechanism known from U.S. Pat. No. 39 19 891 it is difficult to accurately engage the individual gears with the chain correctly positioned on the respective sprocket, because the reaction forces of the chain, travel-induced shocks and vibrations, and the gear shift forces result in excessive loads acting on the relatively movable housing portions, resulting in rapid wear and thus impairing the gear shift accuracy.

In a further electromechanical bicycle gear shift mechanism of another type known from U.S. Pat. No. 40 41 788, an electric motor is operable to move a lever arm carrying a floating gear adapted to assume two engagement positions with respect to a spindle drive mechanism for moving a shift actuator member in opposite directions along an axis extending parallel to the rear wheel axis. The rotation of the spindle drive mechanism is derived from the chain movement. Associated to the chain tensioning lever and to the lever arm carrying the floating gear are a plurality of positioning wiper contacts included in the electrical circuit for controlling the electric motor and serving for accurately positioning the shift actuator member in respective gear engagement positions by reversing the electric motor controlling the gear shift operation when the tensioning lever reaches the accurate gear engagement position to thereby disengage the floating gear at an accurately timed instant.

Known from FR Patents 10 03 373 and 12 77 691 are purely mechanical bicycle gear shift mechanisms in which the carrier of the shift actuator member formed as a chain tensioning lever or a deflector sprocket is guided in a housing in a simple sliding guide assembly, any rotation of the carrier being prevented by a guide pin engaging a longitudinal groove or by a non-circular cross-section of the carrier.

In an electromechanical bicycle gear shift mechanism known from FR-PS 22 33 220, the carrier simultaneously acts as the shift actuator member freely guided in a transverse guide slot and threadedly engaged with a spindle connected to an electric motor. The electric control circuit of the motor contains series-connected reed switches and simple change-over switches with control relais and diodes.

In an electromechanical bicycle gear shift mechanism known from FR-PS 25 87 079, the embodiment comprising a shift actuator member displaceable parallel to the wheel axis, the actuator member is inadequately guided on an exposed transverse guide bar. The control circuit for the electric motor comprises printed circuit components and a plurality of wiper contacts highly sensitive to wear and contamination.

From GB-PS 004 05 09 there is finally known a linear motor of the stepped-motion type in which the position of the movable motor component is monitored by an electro-optical sensing device comprising fotocells, receiving elements and a longitudinally extending scale and operating to generate countable signals indicative of the position of the movable motor component.

It is an object of the invention to provide an electromechanical bicycle gear shift mechanism of the type defined in the introduction, which offers a high degree of shifting accuracy and is resistant to wear over long periods of use.

The cursor is safely protected within the housing and accurately guided over its full admissible range of movement. The reaction forces of the chain, travel-induced shocks and vibrations, and gear-shifting forces are thus transmitted from the cursor to the housing over a large area. The cursor is easily movable under the forces acting thereon. Dirt and moisture are prevented from entering the guide portion of the cursor. In this manner a wear-reduced shifting operation with a high degree of accuracy and accurately reproducible shift movements is ensured over a long time of use even in the case of frequent shifting operations.

In an advantageous embodiment the projection forms an extension of the cursor and projects from the housing through the slide seal gasket. This provides effective protection against the entering of dirt and moisture at this location. The slide seal gasket may contribute to the guiding of the cursor, although this is not indispensable for proper operation.

In view of the fact that bicycle gear shift mechanisms are subjected to high demands regarding low maintenance and perfect reliability, and that compact dimensions are desirable, because the gear shift mechanism projects beyond the contours of the bicycle in any case,, all of the movable elements are suitably combined and encapsulated in the smallest possible space. This results in minimum dimensions.

A further advantageous embodiment comprises a construction in which the cursor cooperates effortless with its guides, and in which the sliding resistance to the cursor movements remains constant practically independent of the influences of time and temperatures Even after a long time of use, the shifting accuracy will not be impaired by the occurrence of play between the cursor and its guides The cursor can be manufactured at relatively low expenditure and with accurate dimensions, for instance on a mass-production base. The oval cross-sectional shape results in high dimensional stability and ensures a wide spacing of the guides, favouring accurate guidance even under relatively great forces. The oval cross-sectional shape also substantially conforms to that of the housing, so that the latter is given a pleasing appearance with compact dimensions. The slide bearings merely have to be press-fitted into the bores.

According to a further embodiment, the forces for the shifting movements are introduced into the rack closely adjacent the guides, so that harmful torque loads are substantially avoided. The positioning of the rack on top and of the longitudinally extanding positioning element at the bottom side of the cursor favours the compact dimensions desired for the housing In another advantageous embodiment the derailleur comprises a tensioning arm carrying two idler sprockets for the chain, mounted on a bearing stud secured to the carrier, and spring-biased in one direction of rotation thereabout. The thus constructed mounting of the derailleur can be readily accommodated in the cursor, resulting in the advantages of compact dimensions and a compact and stable retention of the tensioning arm. Practically the full length of the cursor and its extension is available for mounting the derailleur, so that there need not be any exposed elements between the cursor and the derailleur. The housing of the gear shift mechanism may be placed closely adjacent the chain, so that the distance it projects beyond the contours of the bicycle is minimized, to thereby reduce the dangers of injury or of damage to the houses to a minimum.

In a structurally simple and readily mountable embodiment, the tensioning lever is not only capable of performing its proper movements required for the tensioning function, but is also coupled to the cursor practically without any play, so that the shifting movements are accurately transmitted to the chain. This ensures that the shifting accuracy obtained by the reliable guidance of the cursor is also adhered to by the tensioning arm.

In a gear shift mechanism known from U.S. Pat. No. 4,041,788, a row of wiper contacts is disposed on one housing wall. Movement of the tensioning arm causes a contact finger carried thereby to travel over the wiper contacts. The closing of any contact indicates that a determined gear shift position has been reached by the tensioning arm, enabling the motor to actuate a shifting lever for a drive gear to thereby terminate the movement of the tensioning arm. This construction suffers from the shortcoming that the wiper contacts are prone to wear and corrosion, and that the construction and operating principle employed with its multi-component mechanical feedback system does not always ensure that the tensioning arm stops at the position accurately corresponding to the selected gear shift position. Even small deviations from this position, however, result in distortion of the chain on the respective sprocket, and in a noticeable reduction of the efficiency of the gear shift mechanism.

In an electromechanical bicycle gear shift mechanism, in which the housing contains positioning means for the carrier forming part of the electric circuit for the control of the electric motor and aligned with a positioning element moving in unison with the carrier, it is another object of the invention to simplify the construction for the accommodation of the electric circuit and the cooperating positioning elements as far as possible and at the same time to ensure wear-free and reliable cooperation of the positioning components.

In an embodiment devised to attain this object, the circuit carrier plate can be readily incorporated in the housing without requiring additional space therefor. The plate functions simultaneously as the carrier of the positioning device. Since the positioning element is structurally combined with the cursor acting as the carrier, the space requirements are reduced to result in compact dimensions. The contact-free cooperation between the positioning element and the positioning device, and particularly the optoelectronic sensors, are effective to avoid any wear. The indication of the actual position of the carrier is directly transmitted to the electric circuit. The sensors are of a commercially available type, inexpensive, and capable of long-time trouble-free operation thanks to their protected accommodation within the housing.

According to a further embodiment, the direction of rotation of the electric motor is reversed to automatically return the gear shift mechanism to the previously held gear shift limit position when the user erroneously enters a shifting pulse that would result in derailment of the chain because there is no further sprocket beyond the sprocket corresponding to the gear shift limit position. In the case of the gear shift mechanism known from U.S. Pat. No. 40 41 788 it is not explained by what means this problem is to be solved.

A further advantageous embodiment includes an inexpensive positioning element capable of being easily manufactured and mounted. This element desirably contributes to the required shifting accuracy by permitting the scanning ranges to be defined in a simple manner. The bifurcate light barriers cooperate with the strip in a highly reliable manner.

Another advantageous embodiment provides the effect that in case of erroneous actuation surpassing the gear shift limit position, the direction of rotation of the electric motor is reversed after the carrier with the tensioning arm has moved by a small distance, to thereby return to the gear shift limit position, so that derailment of the chain is safely prevented. The limited movement of the carrier prior to the reversal of the electric motor results in a certain distortion of the chain with respect to the limit position sprocket, but only for a very short instance, so that the user is scarcely incommodated.

According to another embodiment the logic circuit component cooperates with the sensor to prevent a shifting operation from being initiated unless the movement of the chain is sufficient for ensuring a smooth and reliable shifting operation.

In another embodiment the stop reset feature is effective to ensure that the user is enabled to resume pedalling with a small or the smallest transmission rate, without having to shift gears, after having approached a stop, for instance at a traffic light, with ) a greater transmission rate. Otherwise it could by rather heavy work to start with the previously selected great transmission rate.

From U.S. Patent there is also known a control circuit for an electromechanical bicycle gear shift mechanism actuated by a DC motor. This known control circuit comprises a wiper contact disc connected to the DC motor and rotatably mounted opposite a plurality of wiper contacts associated to individual gear shift positions. A Bowden cable operatively connects the rotatable disc to a derailleur of the same construction as the derailleur of a mechanically operable bicycle gear shift mechanism. Provided on the handlebar of the bicycle is a switch contact set operable by means of a rotatable lever and electrically connected to the wiper contacts, so that the desired operation of the DC motor is achieved in response to the position of the switch contacts and the rotary position of the contact disc. Due to the great number of electromechanical components and wiper contacts, this known gear shift mechanism is excessively expensive in production, and in addition scarcely suitable for operation under varying environmental conditions typical in use of a bicycle gear shift mechanism.

It is therefore further intended to improve a control circuit for an electromechanical bicycle gear shift mechanism operable by a DC motor, to thereby increase its reliability in operation which while achieving an extremely simple mechanical construction of the control circuit.

Figure 2:
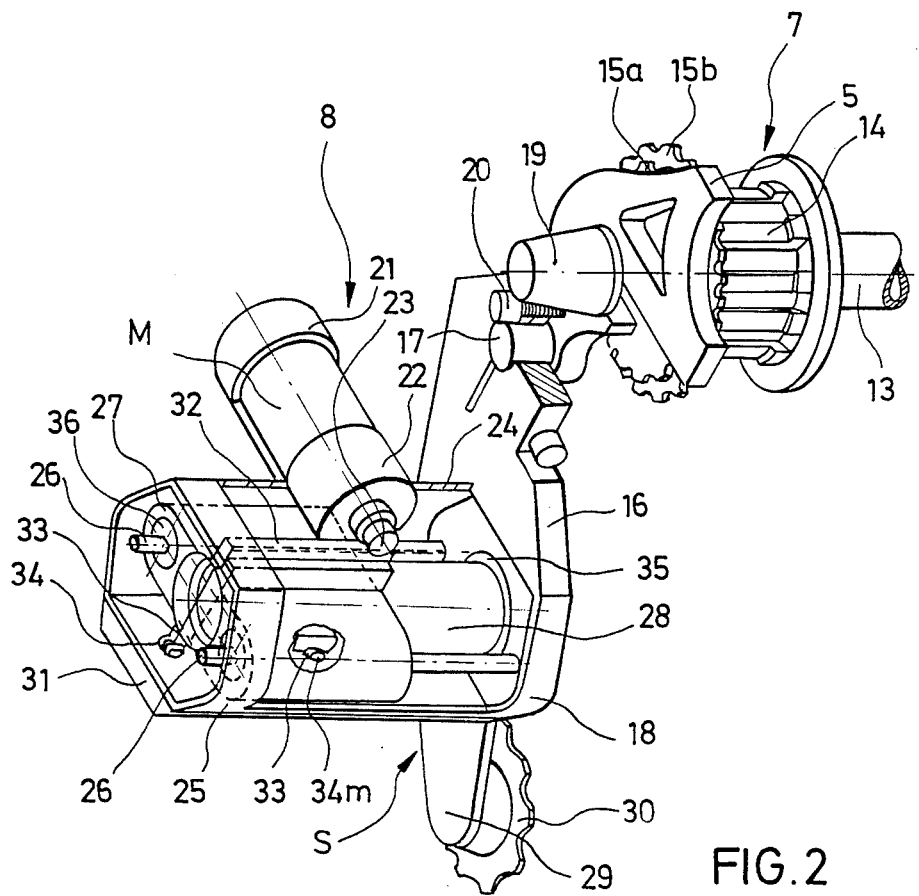
Figure 3:
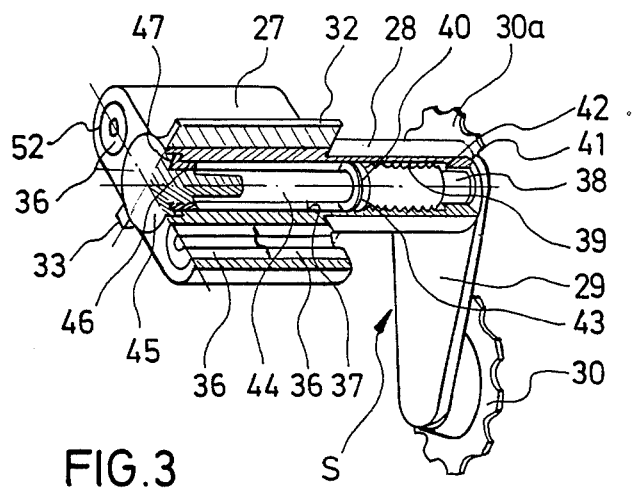
Figure 4:
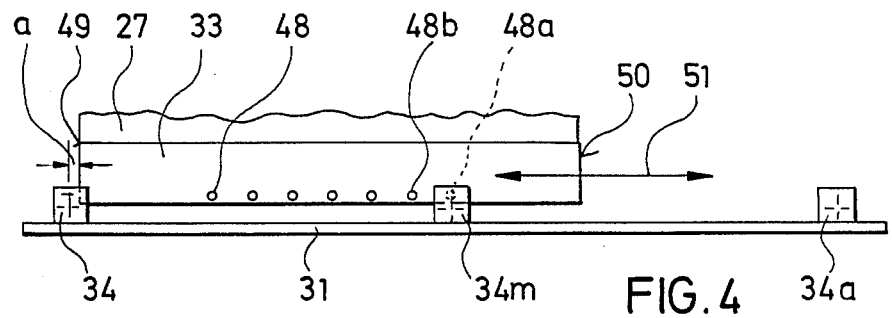
Figure 6:
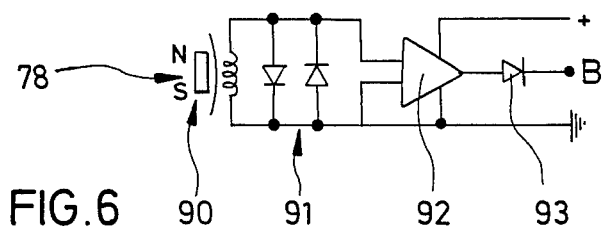
Figure 7:
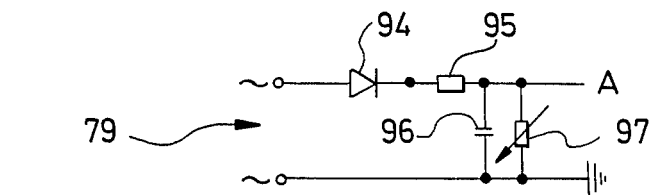
Figure 5:
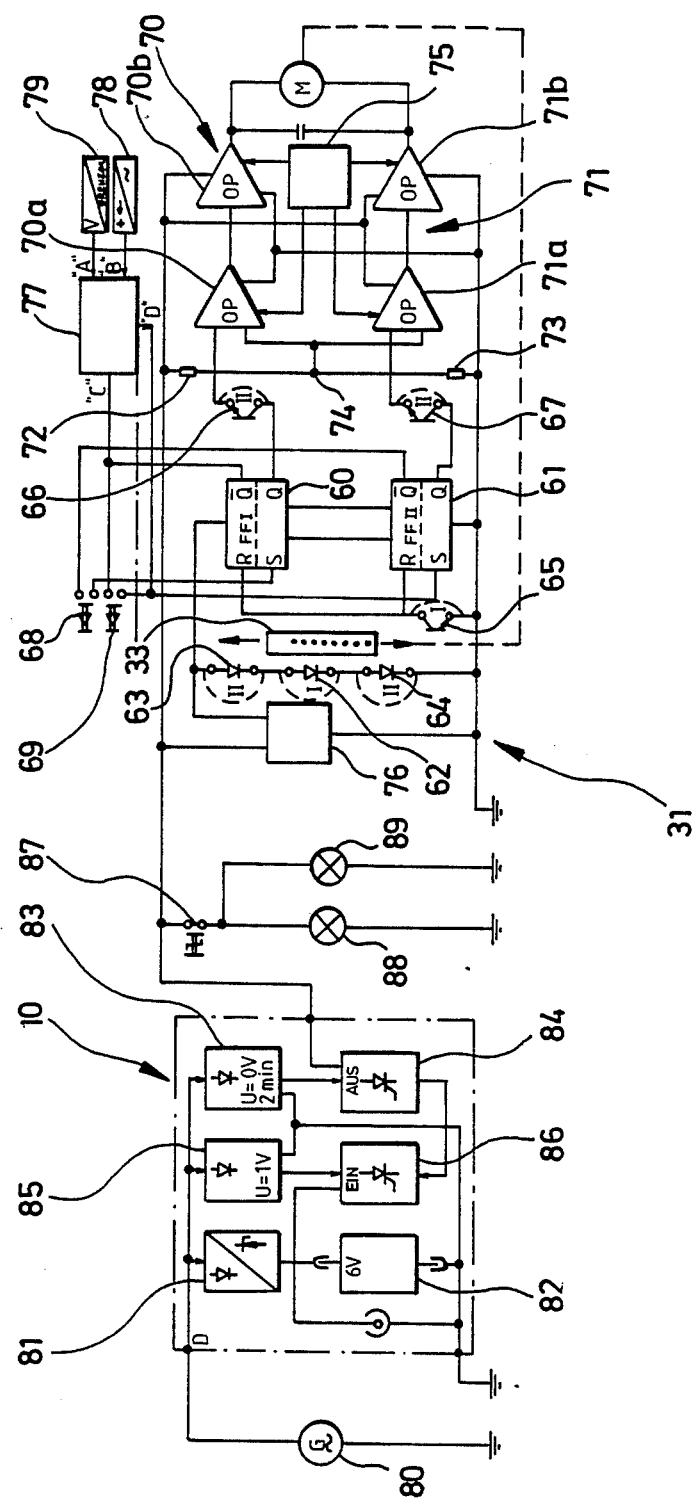

An embodiment of the invention shall now be described in detail with reference to the accompanying drawings, wherein:

FIG. 1 shows a bicycle having an electromechanical gear shift mechanism,

FIG. 2 shows a partially sectioned perspective view of the electromechanical gear shift mechanism with components of the rear wheel drive transmission system, FIG. 3 shows a perspective view, partically in section, of an enlarged detail of FIG. 2, FIG. 4 shows an enlarged detail of FIG. 2, FIG. 5 shows a control circuit for an electromechanical bicycle gear shift mechanism, particularly of the type described with reference to FIGS. 1 to 4, FIG. 6 shows a detail of the control circuit of FIG. 5, and FIG. 7 shows a further detail of the control circuit of FIG. 5.

A bicycle 1 has a frame 2 with a front wheel 3 and a rear wheel 4 mounted in the conventional manner in a rear end portion 5 of frame 2. Rear wheel 4 is rotated from a pedal crank sprocket 6 via a chain 9 and a diagrammatically indicated sprocket stack 7 formed of a plurality of chain sprockets defining respective gear shift stages with different transmission rates of the circumferential speed of the pedal crank sprocket. An electromechanical gear shift mechanism 8 indicated in FIG. 1 merely diagrammatically is secured to rear frame end portion 5 for selecting the different gear shift stages. A current source 10 is provided for supplying electric current to the gear shift mechanism, and optionally to bicycle lighting fixtures (not shown). Gear shift mechanism 8 may for instance be operated by means of a gear shift selector 11 mounted on the handlebar. Associated to pedal crank sprocket 6 is a conventional crank bearing dynamo 12 which may also be used as a current source.

Shown in FIG. 2 are details of gear shift mechanism 8 and sprocket stack 7.

Secured to a rear wheel hub 13 is a splined drive transmission sleeve 14 carrying a number of sprockets corresponding to the number of gear shift stages. Shown in FIG. 2 is a sprocket 15a for the limit gear shift stage with the smallest transmission ratio, and an adjacent sprocket 15b for a gear shift stage with a greater transmission ratio. As the selected transmission ratios become greater, the number of revolutions of rear wheel 4 increases for each revolution of pedal crank sprocket 6.

A sidewall 16 of a closed housing 18 is also secured to rear end portion 5 of frame 2 by means of a clamp screw 19 also serving for securing the rear wheel, and a dowel pin 17. The position of sidewall 16 and thus of housing 18 relative to rear frame end portion 5 is finely adjustable by means of an adjustment screw 20.

Incorporated in housing 18 is a housing 21 of an electric motor M including a reduction gear 22 and a drive pinion 23 in such a manner that the rear end of housing 21 projects from housing 18 and drive pinion 23 is positioned within housing 18. The longitudinal axis of motor M extends substantially perpendicular to the longitudinal axis of housing 18, i.e. substantially parallal to rear wheel 4. By contract, the longitudinal axis of housing 18 extends substantially parallel to the rear wheel axis. Housing 18 has a circumferentially extending enclosure wall 24 and a cover 25 secured to the side facing away from bicycle 1. Extending between sidewall 16 and cover 25 are parallel spaced rod-shaped guides 26 for a cursor 27 of oval cross-sectional shape. Cursor 27 is of shorter length than the interior of housing 18 (cf. also FIG. 3). It is integrally formed with a cylindrical extension 28 extending through a slide-seal 35 mounted in sidewall 16. A shift actuator member S for engaging the selected gear shift stages is secured to cursor 27. In the embodiment shown, shift actuator member S is a so-called tensioning arm 29 carrying freely rotatable idler sprockets 30 and 30a (cf. FIG. 3).

As evident from FIG. 2 in connection with FIG. 1, the lower run of chain 9 extends from pedal crank sprocket 6 around idler sprocket 30 from below, around the other idler sprocket 30a, and rearwards around the selected sprocket 15a or 15b, and then again forwards to pedal crank sprocket 6.

Mounted in housing 18 as a housing bottom or on top of a not shown housing bottom is a plate 31 carrying a likewise not shown control circuit for electric motor M and connected to gear shift selector 11 and also to current source 10.

A longitudinally extending rack 32 is mounted on the top surface of cursor 27 or formed integrally therewith to mesh with drive pinion 23. Secured to the bottom side of cursor 27 or formed integrally therewith is a positioning element 33, in the present embodiment a longitudinally extending, upstanding strip or web (FIG. 4). A positioning device provided for cooperation with positioning element 33 is shown in FIG. 2 to comprise a bifurcate light barrier 34.

According to FIG. 3, cursor 27 is a pressure-casting or injection-molded plastic member having an oval cross-sectional shape and integrally formed with extension 28. Cursor 27 is formed with two bores 52 extending parallel to its longitudinal axis, with linear antifriction bearing 36 press-fitted therein, by means of which cursor 27 is guided on rod-shaped guides 26. Between bores 52 cursor 27 is formed with a larger stepped bore 37 in which a bearing stud 38 of tensioning arm 29 is rotatably mounted in a spring-biased state. A coiled spring 39 envelops bearing stud 38 over part of its length. One end 40 of coiled spring 39 is anchored to a collar 43 of bearing stud 38, its other end 42 being anchored in extension 28. Coiled spring 39 is tensioned to bias tensioning arm 29 clockwise in FIG. 3, thus permitting the arm to yield to forces acting counterclockwise clockwise thereon, but tending to automatically return it in the opposite direction. Adjacent the front end of extension 28 stepped bore 37 is provided with a friction bearing 41 in which bearing stud 38 is mounted and which may be formed with an axial bearing surface directed towards tensioning arm 29, so that the latter is easily rotatable. From the other end of stepped bore 37 a retaining bolt 44 is screwed into bearing stud 38, the head 45 and part of the shank of retaining bolt 44 being rotatably received in a friction bearing 46. The latter may also be provided with an axial bearing surface 47 for head 45, so that the assembly formed of tensioning arm 29, bearing stud 38 and retaining bolt 44 is easily rotatable in cursor 27 without any axial play.

Shown in FIG. 4 is the manner in which plate 31, which carries the control circuit shown in FIGS. 5 to 7, supports the positioning device composed of bifurcate light barrier 34, another bifurcate light barrier m, and a third bifurcate light barrier 34a.

Bifurcate light barrier 34m is responsible for the individual possible gear shift positions and for the respective correct positions of cursor 27. Bifurcate light barriers 34 and 34a act as limit light barriers and are effective in the case of faulty actuation to prevent the cursor from being displaced to a position in which the chain would be derailed from respective end sprockets, for instance 15a.

Positioning element 33, which as already mentioned is an upright sheet metal or plastic strip, is secured to the bottom side of cursor 27 and ahs a plurality of scanning locations 48 formed in the present example as bores at spacings corresponding to those of the gear shift positions. Scanning locations 48a and 48b thus correspond to sprockets 15a and 15b shown in FIG. 2. Positioning element 33 further has front and rear scanning edges 49 and 50, respectively, for cooperation with limit light barriers 34 and 34a. The distance between light barrier 34m and each of limit light barriers 34 and 34a exceeds the distance between a limit scanning location 48a and its associated scanning edge 49, of between the other limit scanning location (indicated at 48 in FIG. 4) and the associated scanning edge 50, respectively, by e length a.

The described electromechanical gear shift mechanism operates as follows:

Assuming the the chain is engaged with sprocket 15a in the limit gear shift stage with the smallest transmission ratio, and the rider is pedalling, so that the chain is moving, a gear shift operation may be initiated by a short actuation of the gear shift selector. This results in electric motor M being energized by the electric control circuit to thereby displace cursor 27 in the desired direction by the engagement of pinion 23 with rack 32. This causes scanning location 48a to leave bifurcate light barrier 34m as cursor 27 moves to the right in FIG. 4 (double arrow 51). The electric control circuit keeps electric motor M energized until the next scanning location 48b is aligned with the previously interrupted light beam of bifurcate light barrier 34m. At this instant the electric control circuit operates to deenergize electric motor M and to stop it by electrical braking action. The electric control circuit is provided with a so-called pulse barrier, so that it accepts a subsequent directional pulse only after a previous one has been processed. During the described operation tensioning arm 29 has shifted the chain from sprocket 15a onto sprocket 15b in an accurately aligned position.

If the rider has erroneously entered a directional pulse in the wrong direction, involving the danger that tensioning arm 29 would derail the chain from sprocket 15a, the electric control circuit acts to energize electric motor M for displacement of cursor 27 to the left in FIG. 4. In this case, after displacement over the length a scanning edge 49 interrupts the light beam of limit light barrier 34a, whereupon the electric control circuit acts to reverse the rotation of electric motor M to return cursor 27 to the right in FIG. 4 to the position in which scanning location 48a is again aligned with light barrier 34m, so that the gear shift mechanism is maintained in the previously held limit shift stage. The rider may then enter a shift pulse in the opposite direction for causing the desired shifting operation to be properly performed.

It would also be conceivable to install electric motor M with its axis parallel to the longitudinal axis of housing 28, in which case the displacements of the cursor could be controlled by a worm drive or threaded spindle mechanism.

Tensioning arm 29 might also be replaced by a gear shift plunger acting as a shifting actuator S for shifting the various shifting stages in a hub gear shift mechanism.

If the pedal crank assembly is provided with a plurality of sprockets of different size, a gear shift mechanism corresponding to gear shift mechanism 8, but having a smaller number of shifting stages, could also be provided at this location.

A preferred embodiment of the control circuit according to the invention shall now be described in detail with reference to FIG. 5. Control circuit 31 includes a first flip-flop circuit 60 and a second flip-flop circuit 61. First flip-flop circuit 60 belongs to the upper section of the circuit shown in FIG. 5 for the up-shifting operation, while second flip-flop circuit 61 belongs to the lower circuit section in FIG. 5 for the down-shifting operation. Each flip-flop circuit 60, 61 has an inverting output Q and a non-inverting output Q, a set input S and a reset input R. Connected to the inverting outputs Q of the respective flip-flop circuits 60, 61 via respective photo-transistors 66, 67 are a first and a second power control circuit 70, 71 each composed of two operation amplifiers 70a, 70b and 71a, 71b connected in series. At a common input junction 74 each power control circuit 70, 71 is supplied with a reference voltage in the form of an intermediate voltage between a first and a second voltage generated by a voltage divider 72, 73. A common circuit section 75 is provided for supplying power control circuits 70, 71 with a supply voltage. In addition, first power control circuit 70 is supplied with the second voltage, and second power control circuit, with the first voltage. When the input signal of first power control circuit 70 is "high" and the input signal of second power control circuit is "low", the output signal of first power control circuit 70 is substantially equal to the first voltage, while that of second power control circuit 71 substantially equals the second voltage. When the input signal of first power control circuit 70 is "low" and that of second power control circuit 71 is "high", the output signal of first power control circuit 70 substantially corresponds to the second voltage, while that of second power control circuit 71 substantially equals the first voltage. The output signals of power control circuits 70 and 71 are applied to DC motor M.

A phototransistor 65 in its activated state acts to connect the reset inputs of the two flip-flop circuits 60, 61 to the second voltage. Phototransistor 65 cooperates with a light emitting diode 62 to form the first bifurcate light barrier 34m already referred to in context with the description of FIG. 4.

In the properly engaged state of the various gear shift stages of the bicycle gear shift mechanism, the light path between this (first) light emitting diode 62 and the (first) phototransistor 65 extends through a respective scanning window 48a, 48b of positioning element 33. During a gear shift operation positioning element 33 interupts the light path, causing first phototransistor to assume its nonconductive state.

The set input S of first flip-flop circuit 60 is connected to inverting output Q of second flip-flop circuit 61 through an UP switch 68. The set input S of second flip-flop circuit 61 is connected to inverting output Q of first flip-flop circuit 60 through a DOWN switch 69. The inverting output of first flip-flop circuit 60 is further connected to a shift stop circuit 77 itself connected to a chain sensor 78 and a rotary speed sensor 79.

As shown in FIG. 6, chain sensor 78 comprises a magnetoelectric movement sensor 90, a pair of inversely connected diodes 91, a switching amplifier 92 and an output diode 93 for sensing the movement of the chain.

Rotary speed sensor 79 is connected to a generator 80 acting to generate an AC output signal with an amplitude proportional to the bicycle speed. Rotary speed sensor 79 comprises a diode 94 and an RC circuit 95 to 97 for converting this output to a DC voltage signal the amplitude of which is indicative of the actual bicycle speed. When stop shift circuit 77 senses a stationary condition of the bicycle on the basis of the output signals of chain sensor 78 and rotary speed sensor 79 applied thereto, it generates a "high" output signal which is applied to the set input of second flip-flop circuit 61.

A second light emitting diode 63 and a third light emitting diode 64 cooperate with second and third phototransistors 66, 67 to form the limit light barriers 43 and 34a, the functions of which have already been explained with reference to FIG. 4. When positioning element 33 assumes its respective end or limit positions, the light path from second or third light emitting diode 63, 64 to second or third phototransistor 66, 67 is interrupted, causing the latter to assume its non-conductive state. This causes the associated one of power control circuits 70, 71 to be switched over, so that the polarity of the motor control signal is reversed, causing the motor to reverse its direction of rotation until positioning element 33 has returned to the position in which a scanning location 48a, 48b is aligned in the light path between firsz light emitting diode 62 and first phototransistor 65, whereupon flip-flop circuits 60, 61 are returned to their reset state.

The function of the hitherto described components of control circuit 31 shall now be explained. Proceeding from an intermediate gear shift stage, when UP switch 68 is actuated, a set signal is applied to first flip-flop circuit 60. As a result, first power control circuit 70 generates a "high" output signal, causing motor M to rotate in the selected direction. Even if Up switch 68 opens during this rotation of motor M and the corresponding displacement of positioning element 33 between two gear shift positions, the described state of energization is maintained until a reset signal is applied to the reset input of first flip-flop circuit 60. This reset signal is generated when the respective next scanning window of positioning element 33 is aligned in the light path between first light emitting diode 62 and first phototransistor 65. This reset operation returns both flip-flop circuits 60, 61 to their reset state, so that the output signals of both power control circuits 70, 71 are "low", causing motor M to be stopped. A DOWN-shift operation is initiated by actuation of DOWN switch 69 and proceeds in a similar manner as the UP-shift operation.

Any shifting operation beyond the high or low limit shift stages in the case of erroneous actuation of switches 68 or 69 is prevented, as already described, by the response of the phototransistors 66, 67 of first or second limit light barriers 34 or 34a, causing the direction of movement to be reversed after the positioning element has reached its respective limit position.

When the rider of the bicycle comes to a stop with his bicycle in high gear, this condition is sensed by shift stop circuit 77 by means of sensors 78 and 79. In response to this state, a "high" control signal is applied to second flip-flop circuit 61, causing the gear shift mechanism to shift down to the lowest gear.

The control circuit is energized by a current source 10 to which a headlamp 88 and a taillight 89 are additionally connected through a light switch 87.

Current source 10 includes generator 80 connected to an accumulator 82 through a rectifier 81. Also connected to generator 80 is a timer circuit which is responsive to the generator output signal dropping below a minimum value or to zero volts for more than a predetermined period of for instance two minutes. In this case an output switch 84 is caused to open, so that any further current consumption by the control circuit and by the DC motor is avoided in the stationary condition of the bicycle. An enable switch circuit 85 likewise connected to generator 80 responds to the output voltage of generator 80 rising above a predetermined minimum value of for instance one volt for actuating an associated switch 86, to thereby achieve optimum charging and consumer characteristics of the control circuit.

Generator 80 may be provided in the form of a pedal crank bearing dynamo.

The control circuit according to the invention may also be energized by an accumulator to be charged from a power mains outlet. In this case current source 10 with generator 80 may be omitted.

A switch provided at the output side of generator 80 permits the generator or dynamo to be switched on and off at will. In this manner, the dynamo may be switched off when riding uphill, and activated for charging accumulator 82 when coasting downhill.

The control circuit according to the invention Is not only suitable for employ with the described bicycle gear shift mechanism, but may also be employed with any other bicycle gear shift mechanism actuated by a DC motor.

I claim:

1. An electromechanical bicycle gear shift mechanism (8) comprising a housing (18) secured to a frame and carrying an electric motor (M), a carrier for a shift actuator member (S) in the form of a tensioning arm (29) of a derailleur or a shifting plunger of a hub gear transmission, said carrier being mounted in said housing for reciprocating displacement parallel to the wheel axis, a drive transmission member adapted to be driven by the electric motor (M) and operatively connected to said carrier, and an electric circuit for said electric motor (M) adapted to be controlled through a gear shift selector (11), characterized in that said carrier is a cursor (27) slidably mounted in said housing (18) on at least two mutually spaced parallel guides (26) fixedly connected to said housing (18), the side of said cursor (27) facing towards said shift actuator member (S) being provided with a preferably integrally formed extension (28) extending through a sliding seal gasket (35) in a sidewall (16) of said housing (18) facing towards the wheel (4).

2. An electromechanical bicycle gear shift mechanism according to claim 1, characterized in that said guides (26) comprise rods anchored between housing walls (16, 25), that said cursor (27) is mounted on said guides (26) by means of sliding bearings (36), preferably linear anti-friction bearings, secured in respective bores (52), and that said cursor (27) is a metallic pressure casting or an injection-molded plastic body of oval cross-sectional shape formed with a through-bore (37) also passing through said extension (28) and disposed between said bores (52) for said slide bearings (36).

3. An electromechanical bicycle gear shift mechanism according to claim 1, characterized in that said electric motor (M) has a gear transmission (22) integrated in said housing (18) in such a manner that the longitudinal axis of said electric motor (M) extends substantially horizontal and perpendicular to the direction of movement of said cursor (27).

4. An electromechanical bicycle gear shift mechanism according to claim 1, characterized in that said drive transmission member is a rack (32) mounted on said cursor (27) and meshing with a drive pinion (23) of said gear transmission (22).

5. An electromechanical bicycle gear shift mechanism according to claim 4, characterized in that said rack (32) is disposed on and preferably formed integrally with a top surface of said cursor (27), and that a longitudinally extending positioning element (33) is disposed on, and preferably also integrally formed with a bottom surface of said cursor (27).

6. An electromechanical bicycle gear shift mechanism according to claim 1, wherein said shift actuator member comprises a tensioning arm (29) provided with two idler sprockets (30, 30a) for the chain (9) and mounted in a spring biased manner or said carrier by means of a bearing stud (38), characterized in that said bearing stud (38) together with a tensioning spring (39) is mounted in said through-bore (37) of said cursor (27) by means of rotary bearing means (41, 46) and a retaining bolt (44).

7. An electromechanical bicycle gear shift mechanism according to claim 6, characterized in that said through-bore (37) of said cursor (27) is formed as a stepped bore with its diameter decreasing in the direction towards said wheel (4), that said bearing stud (38) is inserted into said through-bore (37) from the end thereof facing towards the bicycle and retained by the retainer bolt (44) threaded thereinto from the opposite end, that said tensioning spring (39) is a coiled spring having one end anchored to said bearing stud (38), and the other, in said cursor (27), and that said bearing stud (38) and said retainer bolt (44) are rotatably mounted in friction bearings (41, 46) pressfitted into said through-bore (37), so that the head (45) of said retainer bolt (44) is at least flush with the one end of said cursor (27), and said tensioning arm (29) is in contact with the wheel-side end of said cursor (27) or disposed immediately adjacent thereto.

8. An electromechanical bicycle gear shift mechanism according to claim 1, wherein said housing (18) contains a positioning device for said cursor which is associated to said electric circuit for the control of said electric motor (M) and disposed in alignment with a positioning element (33) displaceable in unison with said carrier, characterized in that said electric circuit is disposed on a base plate (31) secured to a housing side, that said positioning element (33) is provided with a plurality of scanning locations (48, 48a, 48b . . . ) for said positioning device disposed on said base plate at mutual spacings corresponding to those of the gear shift stages provided, and that said positioning device comprises at least one opto-electronic sensor (34m) cooperating with said positioning element (33) in a non-contacting manner.

9. An electromechanical bicycle gear shift mechanism according to claim 8, characterized in that in addition to said scanning locations (38a, 38b . . . ) there are provided two scanning locations (49, 50) associated to the limit gear shift stages (15a) cooperating, preferably in trailing relationship, with two sensors (34, 34a) for reversing the direction of rotation of said electric motor (M).

10. An electromechanical bicycle gear shift mechanism according to claim 9, characterized in that said electric circuit is connected through a logic switch member (60, 61) to a movement or speed sensor (78, 79) from being energized when said chain is at a standstill.

11. An electromechanical bicycle gear shift mechanism according to claim 10, characterized in that said movement or speedsensor (78, 79) for said chain (9) cooperates with a speed or movement sensor (78, 79) for said wheel (4) and said logic switch member (60, 61) to form a shift stop circuit (77) operable in the stationary condition to automatically energize said electric motor (M) for selecting a gear shift stage with a small transmission ratio or the limit gear shift stage with the smallest transmission ratio.

12. An electromechanical bicycle gear shift mechanism according to claim 8, characterized in that said positioning element (33) comprises a strip having a row of through-openings and front and rear switch edges (49, 50), and that said positioning device comprises three bifurcate light barriers (34, 34m, 34a) to be actuated by said strip.

13. An electromechanical bicycle gear shift mechanism according to claim 8, characterized in that each limit bifurcate light barrier (34, 34a) is spaced from said bifurcate light barrier (34m) by a distance which is greater by a length (a) than the distance between a respective through-opening (38, 38a) for a limit gear shift stage and the scanning edge (49, 50) adjacent the respective through-opening, and that each limit bifurcate light barrier (34, 34a) is connected to a respective circuit section operable to reverse the direction of rotation of said electric motor (M). pg,24

* * * * *